United States Patent [19]

Boyce

[11] 4,433,489

[45] Feb. 28, 1984

[54] VEHICLE ALIGNMENT APPARATUS AND METHODS

[75] Inventor: William A. Boyce, Huntington Beach, Calif.

[73] Assignee: Macaster Controls, Inc., Huntington Beach, Calif.

[21] Appl. No.: 337,252

[22] Filed: Jan. 5, 1982

[51] Int. Cl.³ .................... G01B 5/255; G01B 3/56; G01B 3/00
[52] U.S. Cl. ............................... 33/203.18; 33/203.2
[58] Field of Search ........... 33/203.15, 203.16, 203.17, 33/203.18, 203.19, 203.2, 203.21, 288, 336

[56] References Cited

U.S. PATENT DOCUMENTS

| 3,292,268 | 12/1966 | Knight | 33/203.2 X |
| 3,426,438 | 2/1969 | Wilkerson | 33/203.18 X |
| 3,805,399 | 4/1974 | Price | 33/203.18 X |
| 4,200,988 | 5/1980 | Hunter | 33/203.2 |

FOREIGN PATENT DOCUMENTS 1548203  9/1969  Fed. Rep. of Germany ..... 33/203.2

Primary Examiner—Harry N. Haroian
Attorney, Agent, or Firm—Fowler, Lambert & Hackler

[57] ABSTRACT

Motor vehicle wheel alignment measuring apparatus, which enables measurement of toe-in, lateral offset and out of square conditions with respect to any given set of tires, comprises pairs of frames adapted to be hung by hooks against the side walls of the exposed tires of a set of tires. Each frame includes a cross bar and a pair of upward and inward extending, short stub members. Each pair of frames includes clamps to secure the free ends of a pair of tape measures, and slots to secure the ends of a pair of elastic bands, so that the tape measures and the elastic bands may be disposed across the width of a vehicle. Methods include measuring the toe-in of a set of tires by comparing the distances between corresponding ends of the cross bars, and then measuring the offset and out of square of the sets of tires by comparing the center marks on the elastic bands extending between the tires of one set with a straight line projected from the center marks of the elastic bands extending between the tires of another set on the vehicle.

15 Claims, 11 Drawing Figures

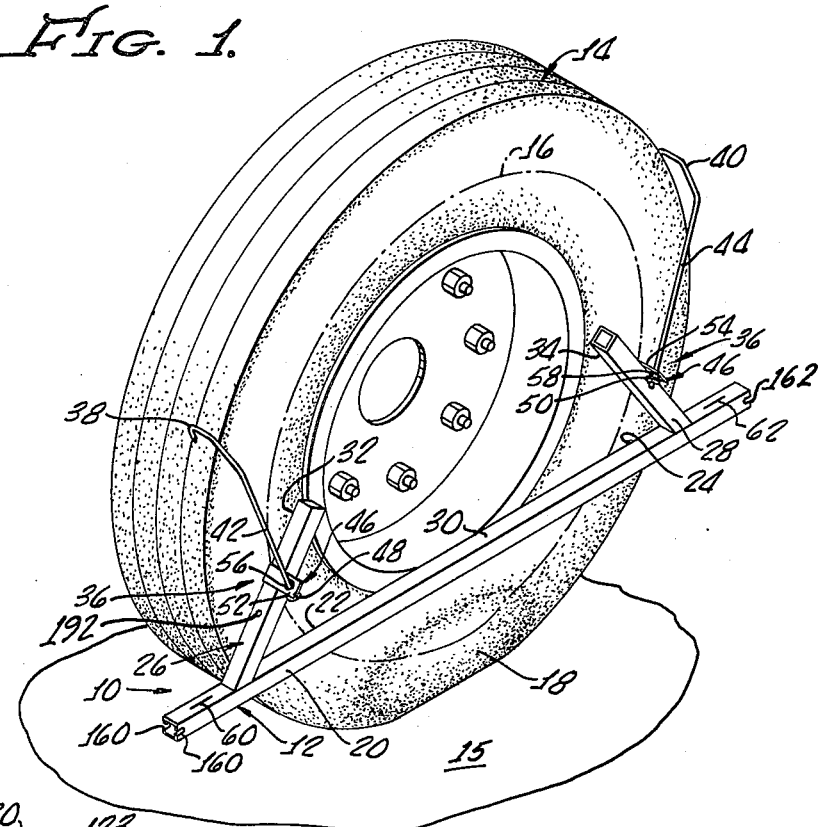

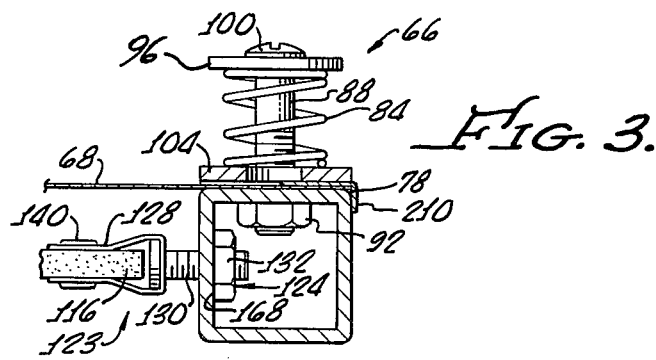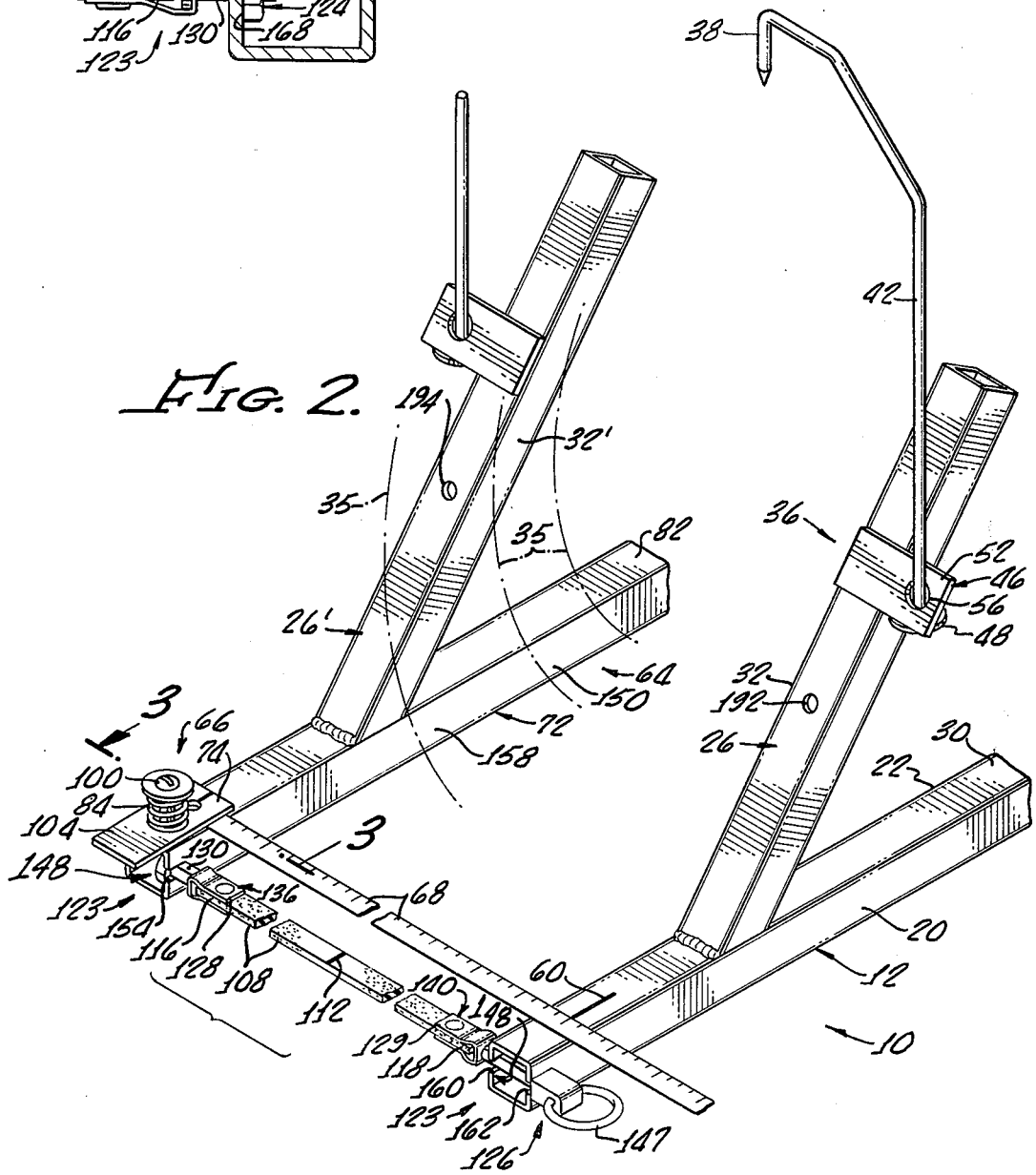

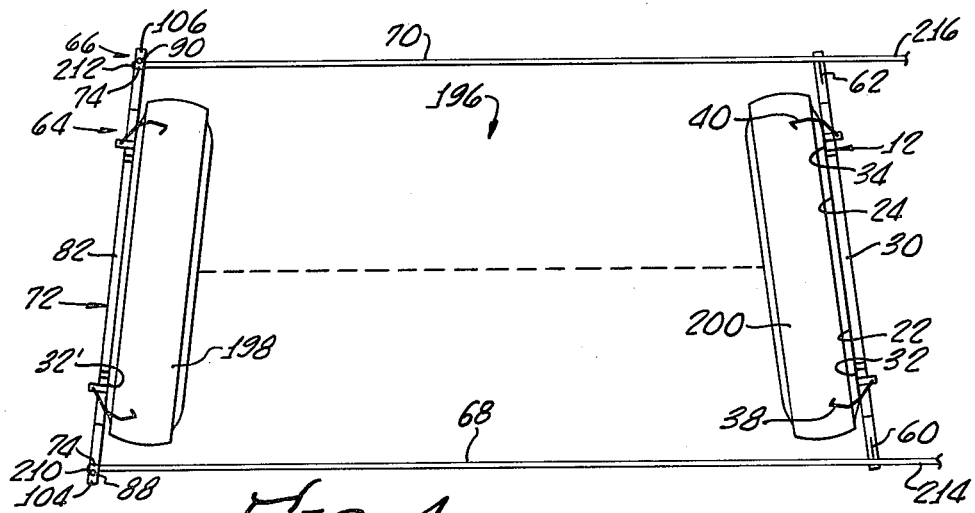
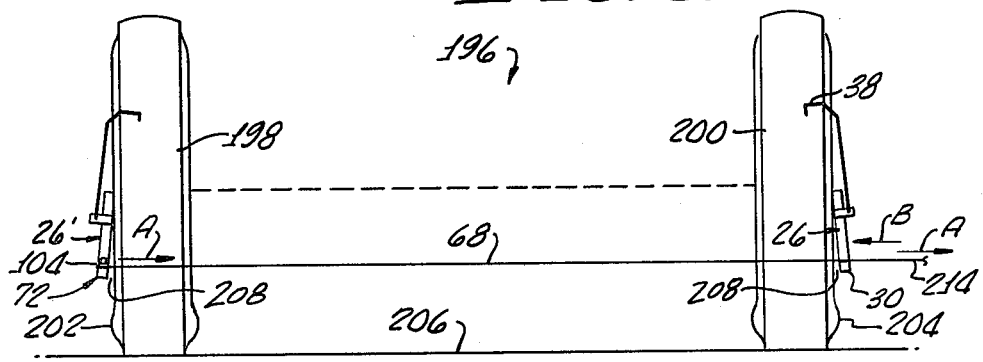
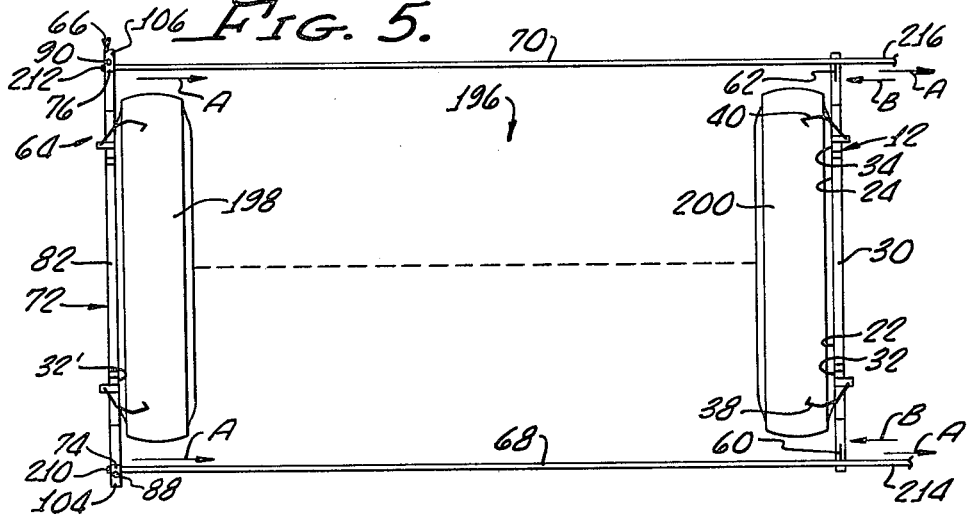

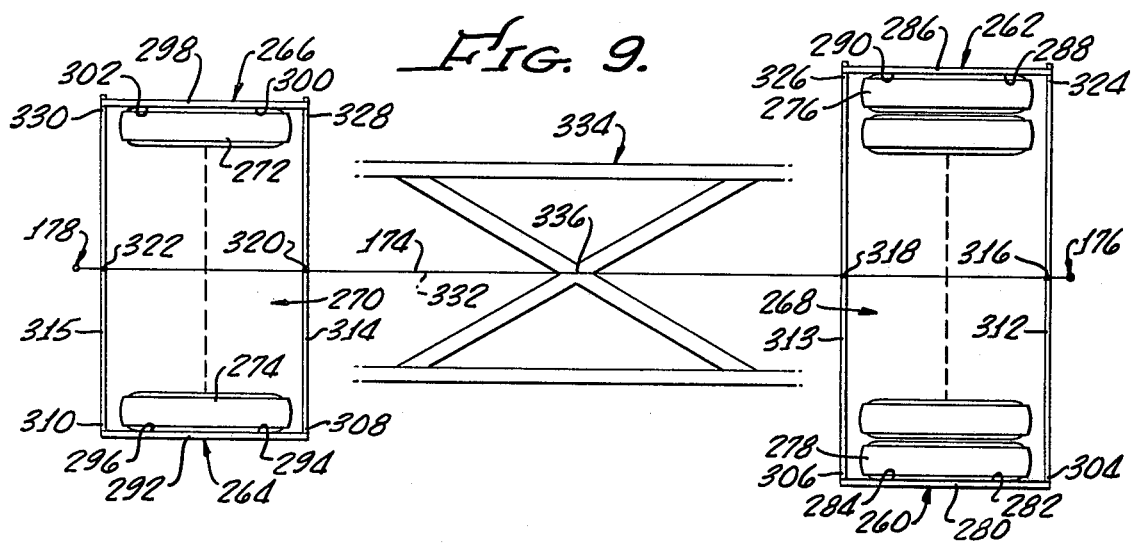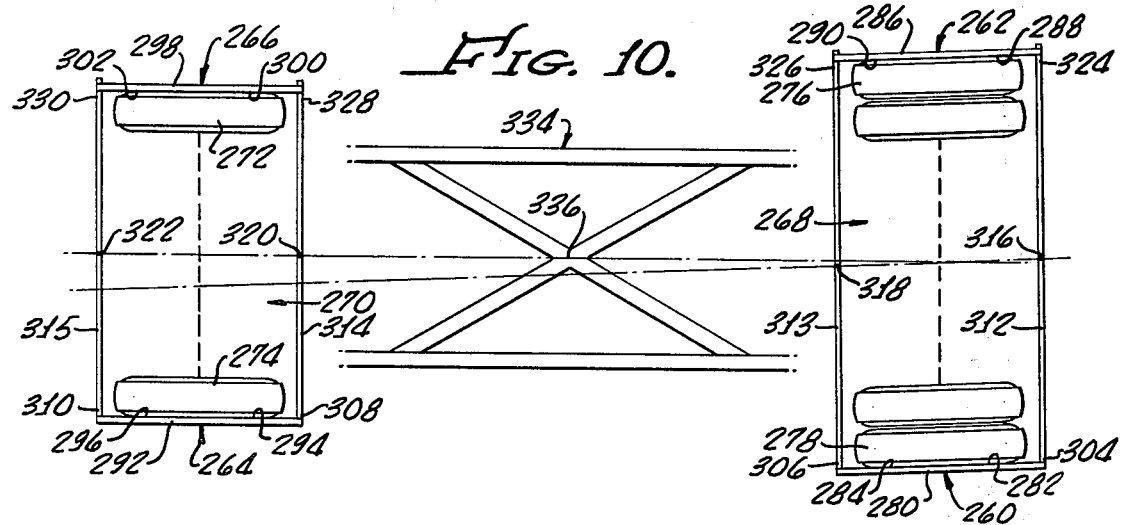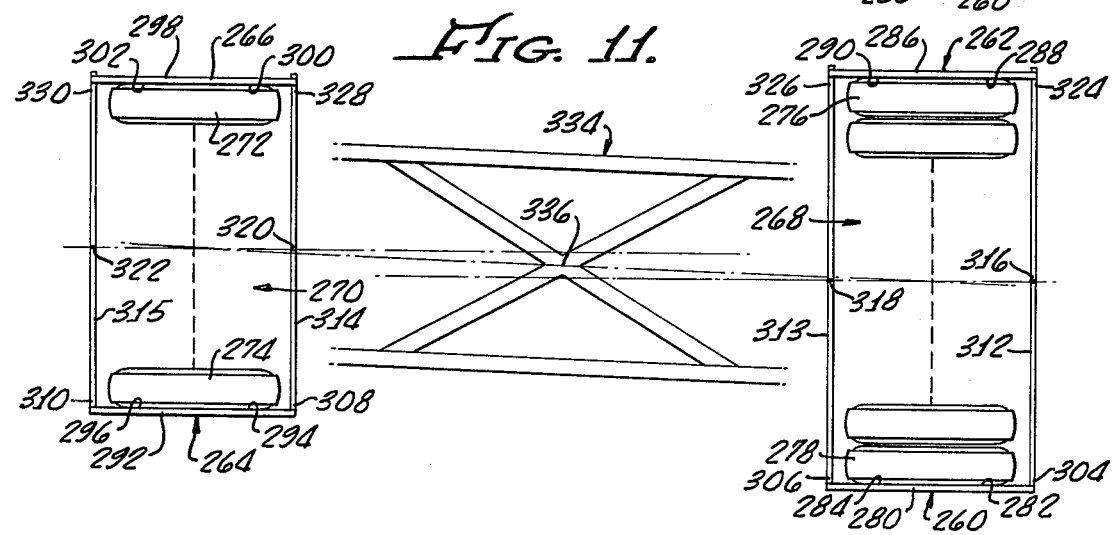

VEHICLE ALIGNMENT APPARATUS AND METHODS

BACKGROUND OF THE INVENTION

1. Field of the Invention

This invention relates to apparatus and methods for measuring alignment relative to the conventional front and rear sets of tires of an automobile, truck or trailer vehicle.

2. Description of the Prior Art

Tire wear contributes greatly to automobile and truck operating expenses. Wheel alignment is a very substantial factor in tire wear. Relatively small maladjustments in alignment can easily result in a high rate of tire wear, thus greatly increasing the motor vehicle operating costs.

The alignment problem is complicated because of the use of steering gear which converts rotational steering wheel movement into side-to-side swiveling of the steerable wheels. As discussed in detail in applicant's copending U.S. patent application Ser. No. 157,194, filed June 6, 1980, now U.S. Pat. No. 4,353,568) conventional motor vehicle steering gear now typically includes a steering column to which a driver operated steering wheel is attached and in lower regions of which a projecting arm, known as a pitman arm, is connected to a gear box to swing, generally, from fore-to-aft, as the steering wheel is turned.

At each steerable wheel, a "knuckle" assembly is provided which includes a wheel mounting spindle, means for attaching the assembly to the vehicle's suspension system, and a projecting steering knuckle arm or lever enabling swiveling of the knuckle, and hence the wheel, for steering purposes. Two tie rods, usually of equal length, are provided, each being pivotally connected, at a tie rod ball and socket end, to a corresponding one of the steering knuckle arms. Opposite ends of the two tie rods are typically connected, in laterally spaced apart relationship, to intermediate regions of a transverse relay rod, one end of which is pivotally connected to the pitman arm. The other end of the relay rod is pivotally connected to the vehicle frame. Fore-to-aft pivotal movement of the pitman arm, as the steering wheel is turned, is transmitted through the relay rod to the individual tie rods which, through the steering knuckle arms, cause corresponding side-to-side swiveling or steering of the steerable wheels. Typical modern steering systems provide substantial tolerances throughout.

Vehicle steering control is typically provided by various static, angular adjustments of the steerable wheels. Most familiar of these wheel adjustments are caster, camber, steering axis inclination, toe-in, and toe-out in turn (also known as turning radius). Descriptions of these factors may be found in the book entitled *Automotive Suspensions, Steering Alignment and Brakes* by Billiet and Alley (n.p.: American Technical Society, 5th ed. 1974). Overall alignment is also dependent upon the relationships of the various sets of wheels. It is most important that there be no lateral offset between the sets of wheels (i.e., they should "track"), and that each set of wheels be "in square" with one another (i.e., their axes should be parallel).

Among the various alignment factors listed above, the present invention is concerned primarily with toe-in, toe-out in turn, offset and out of square. The importance of these measurements to tire wear will now be explained.

Wheel toe-in is a condition of the tires such that the front regions are closer together than the rear regions. Toe-out is the opposite condition. Neither is desirable in a tire rolling straight ahead, since for minimizing wear, the tires—as they roll—should be exactly parallel. Any amount of toe-in or toe-out causes increased tire wear because it causes sideways tread slipping as the vehicle moves along a road surface. Ideally, the front tires (indeed, all the tires) are precisely parallel in alignment. However, it has long been known that the front tires should be given a slight *static* toe-in, as measured on prior art apparatus. As the vehicle then begins to move, the resultant forces on the tires cause them to turn outward such that they roll approximately parallel. The resultant forces which cause this tendency to toe-out when rolling are due to the fact that when a vehicle moves from a stationary to a rolling attitude the "lash", or accumulated steering system tolerances, is distributed throughout the front end geometry such that the tires are slightly toed-out with respect to their static alignment.

The difference in angular orientation between the two front tires during a turn is known as "toe-out in turn". This difference in angle, which is typically about 2-3 degrees, occurs because road forces concur with the steering geometry and the inherent tendency to toe-out to cause the inside wheel on the turn to describe a smaller circle than the outside wheel. This is generally a desirable state of affairs, because it tends to foster both tires *rolling* through the turn rather than skidding. Problems arise, however, in properly setting toe-out in turn so as to minimize destructive forces on the tires. Toe-out in turn is largely controlled by steering arm configuration and positioning. Unless the steering arms are aligned properly, the toe-out in turn will be different in a left turn than in a right turn. According to the well-known Ackerman theory, the steering arms will yield proper, equal toe-out on turn in both directions if the steering ball joints and steering arms lie on the diagonal lines connecting the steering knuckle axes to the so-called "diamond point", which is essentially the center of the rear axle. (In a three-axle vehicle, the diamond point is between the two axles, axle- and frame-center).

A set of drivers "out of square" with its heavy load of torque can easily become a dominant force. This force can have a "bulldozer" effect (because of its tendency to move in a direction perpendicular to the axle) that sets the front of the vehicle sideways. The vehicle operator will then unknowingly react with a steering wheel change to compensate. When the torque changes, another steering wheel compensation is necessary. The operator will normally interpret this as caused by road change, so he is not put on notice that the tires are developing an unusual wear pattern, in which one wears a toe-out pattern and the other a toe-in pattern. For example, a set of drivers ½° out of square will put the outside dual driving tires of a truck about ½" out of square, i.e., one ¼" ahead and the other ¼" behind a true vehicle transverse axis. Because of the above-described tendency of the drivers (rear tires) to go straight under heavy torque loads, the ½° out of square condition will cause the front tires to be dragged sideways. If a truck has only a 20' span, the front tires can be dragged sideways 2" every 20' of forward travel. The destructiveness to a set of tires is obvious.

To ensure proper toe-out on turn for both turning directions, the front set of wheels must not only be in square with the rear set of wheels (assuming a two-axle vehicle), but the two sets of wheels must also be "tracking", that is, there must be no lateral offset between them. When both these conditions obtain, the sets of wheels are said to be "in diamond", and toe-out in turn will be correctly established.

Various devices and methods for measuring vehicle wheel alignment are known to those skilled in the art. For instance, the Price U.S. Pat. No. 3,805,399, issued Apr. 23, 1974, discloses a pair of triangular frames, formed of metal rod stock. The patentee therein teaches that the triangular frames are each adapted to be urged by a pair of springs into engagement against the sidewalls of a pair of wheels. The triangular frames are used to measure toe-in in conjunction with elongate rods disposed across a vehicle. The frames are also used to support means for measuring camber, caster, and rear wheel tracking. Similarly, Knight U.S. Pat. No. 3,292,268, issued Dec. 20, 1966, also discloses a triangular frame; however, it is formed instead of square rod stock. Still another prior art device utilizes a light beam and mirror arrangement to reflect alignment readings onto a wall chart. It is designed expressly for use in a shop environment.

However, several important problems remain largely unsolved by the prior art. For instance, accuracy of measurement is at best questionable because the measuring is generally done under highly artificial conditions that would only accurately reflect true driving conditions under the most fortuitous of circumstances. Also, prior devices which utilize triangular frames that are adapted to be placed on tire sidewalls are often of such shape and height as to severely limit the types of vehicles and/or tires with which they may be used; they also are sensitive to precise placement of the suspending hooks on the tires in order to place the frames into proper engagement with the sidewalls of the tires. Additionally, most prior devices make no provisions for assessing the amount by which the various sets of wheels may be misaligned, with respect to one another, or to the vehicle frame.

SUMMARY OF THE INVENTION

The present invention provides apparatus and methods to facilitate manual alignment measurements relative to the conventional front and rear sets of tires of an automobile, truck or trailer vehicle by one person while the tires are carrying the weight of the vehicle.

The apparatus of the present invention comprises at least one pair of frames adapted to be disposed respectively on opposite sides of the vehicle loosely adjacent the outer circular side wall peripheries of the exposed tires in a chosen set, each of said frames including an elongated cross bar having coplanar surfaces disposed in spatial relationship to engage different locations on the circular side wall periphery of either of said exposed tires in the chosen set. Each of the frames also includes means for detachably hanging the frame on either of said exposed tires in loose proximity to the side wall thereof. At least one of the frames has hold-down means for detachably capturing the free ends of a pair of conventional tape measures near opposite ends of the cross bar at corresponding positions equally spaced from or even with the coplanar surfaces of the cross bar as measured transversely of the cross bar.

Single person operation is facilitated by providing each frame with means for detachably hanging the frame in loose proximity to the sidewall of a given tire. Thus when in accordance with the present invention, the operator manually snugs up the frame on the exposed tire on one side of the vehicle, and pulls on the tapes to snug the frame on the opposite side against the exposed tire thereon, the operator's "feel" or "touch" allows him to snug both frames evenly without differential fore-and-aft depression into either of the tires, which if done would significantly alter the accuracy of the measurements obtained.

The present invention enables quick, economic, and precise measurements, by one person, and provides measurements that may easily be cross-checked for accuracy.

In one embodiment of the invention, the elongate cross bar of each frame has, intermediate its opposite ends, a pair of relatively short stub members disposed remote from one another and extending upwardly from the cross bar and inwardly toward its center, the stub members having surfaces coplanar with the coplanar surfaces of the cross bar which surfaces are also disposed in spatial relationship to engage different locations on the circular side wall periphery of a tire. The cross bar and stub members are each constructed of tubular metal of rectangular section. The means for detachably hanging the frame on a tire comprises a pair of hooks having shanks, and means connecting the shanks to respective stub members near their upper ends, the connecting means permitting at least a limited universal excursion of the hooks while capturing the shanks thereof so as to loosely hang the frame. The hold-down means for detachably capturing the free ends of a pair of conventional tape measures comprises a pair of spring-loaded pressure plates mounted near opposite ends of the cross bar of the frame for clamping the free ends of the tape measures against corresponding corner surfaces of the cross bar.

In hanging a pair of the frames of the present invention on a set of tires, precise hook placement is not critical to frame engagement with the tires, hence to measurement accuracy. So long as the frames are hung proximate the respective tire sidewalls, accuracy will be assured by the operator's "feel" when manually snugging the frames against the tire sidewalls. There is no hook and spring system by which the opposite ends of the frames are forcefully pulled into tight abutment with different portions of the sidewalls to a degree dependent on each of the hooks of a given frame being placed so as to bias each spring the same. Hence in the present invention there is no danger that one end of a frame will depress the relatively deformable tire sidewall more than the opposite end of the frame, which would of course unbalance the measurement.

The short stub members also provide significant advantages over the relatively tall triangular frames of the prior art. They prevent rotation of the cross bar against tires when a pulling force is applied thereto. In cooperation with the wide, flat surfaces provided by constructing them of rectangular tubing, the stub members help to spread the force over a relatively large surface area of the tire side wall when the cross bar is snugged into abutment with a tire. Hence, the cross bar is prevented from cutting into the deformable rubber of the tire, and accuracy of measurement is maintained. The stub members also provide convenient attachment points for the hooks by which the apparatus is hung on a tire. They minimize interference with the wheel well of a vehicle because of their relative shortness. And, the slant of the stub members maximizes the range of tire sizes with which frames of a given size may be used, while maintaining four-location contact between the frame and a tire, because they may be angled much flatter than the sides of prior triangular frames. The present stub members also maximize their range of usefulness by providing a larger effective opening to accommodate protruding hub caps and wheel spindles than is possible with triangular frames.

Construction of the cross bars and stub members of metal tubing of rectangular section also provides several important advantages in relation to the prior art. First, the hollowness of the members enables one person to handle them easily by providing a significant weight reduction in relation to solid rod stock. The rectangular section provides structural rigidity, and also allows for the convenient attachment of other elements, such as the above-described hold-down means and hooks. Additionally, the flat sides of the tubing present large surfaces with which to abut a tire efficiently.

In another embodiment of the present invention, the apparatus additionally includes at least one pair of elastic bands, adapted to stretch across the width of the vehicle, each band having its center marked, and connection means at each free end thereof disposed equidistant from the center mark. In this embodiment the cross bars of both frames include means for detachably securing near opposite ends thereof, and at corresponding locations parallel or even with the coplanar surfaces of the cross bars as measured transversely of the cross bars, the connection means at the free ends of the pair of elastic bands.

The elastic bands are of sufficient length in their unstretched condition to extend substantially across the entire width of a conventional vehicle, sufficiently to enable them to be connected to a frame on the one side of the vehicle and to freely extend to a position where their free ends can be grasped by a person on the opposite side of the vehicle to stretch the bands and connect them to the frame there disposed.

Because the long elastic bands are for all practical purposes identical and exert only moderate similar forces at near opposite ends of the cross bars of the frames, they may be used to provide the snugging action required to place opposite frames in proper engagement with the side walls of the respective tires in the set, with sufficient accuracy and dependability to enable the toe-in measurement through the use of the measuring tapes. Significantly, the engagement of the respective frames with the side walls of the tires remains insensitive to the placement of the hooks on the tires to hang the frames. Further, the placement of the elastic bands simultaneously functions as an essential step in measuring the alignment between the front and rear sets of tires, due to the center marks on the bands.

Accordingly, the present invention includes the method steps of hanging the frames on the exposed tires in a chosen set so that the cross bars of the frames are approximately parallel to the ground and are disposed above the bulge in the tires necessarily resulting from their carrying the vehicle weight, and so that the coplanar surfaces on the cross bars are disposed in loose proximity to the circular peripheries of the exposed sidewalls of the tires on opposite sides of the vehicle, extending a pair of conventional tape measures underneath and across the vehicle, securing the free ends of the pair of tape measures near opposite ends of the cross bar of the first frame at corresponding positions equally spaced from or even with the coplanar surfaces of the cross bar as measured transversely of the cross bar, manually snugging the cross bar of the second frame against the exposed sidewall of the tire on which it is hung while simultaneously grasping and exerting approximately equal tension on the tape measures so as to similarly snug the cross bar of the first frame against the exposed sidewall of the tire on which it is hung, and noting the difference in measurements of the pair of tapes at corresponding locations on the second frame equally spaced from or even with the coplanar surfaces on the cross bar of the second frame as measured transversely of the cross bar.

Also, in accordance with the method of the invention, the step of hanging the frames is preceded by rolling the vehicle along a straight path for a short distance so as to cause the vehicle steering geometry and tolerances to assume their normal running relationship.

Among the chief advantages of this procedure is that the measuring is not done under highly artificial conditions that make it unlikely that the measurements obtained accurately reflect driving conditions. For instance, when a vehicle is positioned on turnpads, or on a sophisticated lift and turntable apparatus, there is no assurance that alignment readings then taken will be duplicated on the highway, because the inherent steering system tolerances and their interaction with the road surface can easily cause radical fluctuations from the shop-determined measurements. The present invention surmounts the inherent inaccuracies of the highly artificial alignment pit environment, with the traditional dependence on turn pads that are either relatively free-floating or else have turning resistance different than true road resistance, which equipment releases the running road contact and essentially calibrates spindles that move at the whim of accumulated and indeterminate tolerances. Such measurements are not "real" because actual vehicle rod contact and rolling action is normally necessary to sort out the tolerances in a manner that accurately reflects vehicle running conditions.

To complete the alignment measurements between front and rear sets of tires, the method of the present invention includes, in addition to the above steps, the steps of hanging a second set of first and second frames on the exposed tires in a second chosen set of the vehicle tires so that the cross bars of the frames are approximately parallel to the ground and are disposed above the bulge in the tires necessarily resulting from their carrying the vehicle weight, and so that said coplanar surfaces of the cross bars are disposed in loose proximity to the circular peripheries of the exposed sidewalls of the tires on opposite sides of the vehicle, securing near opposite ends of the cross bars of the first frames of the first and second sets of frames at corresponding positions equally spaced from or even with said coplanar surfaces of the cross bars, first ends of two pairs of elastic bands, each elastic band being adapted to stretch across the width of the vehicle in response to relatively minimal pulling force, and each band having a center mark located midway of its length, extending the elastic bands underneath and across the vehicle to the cross bars of the second frames of the first and second sets of frames on the other side of the vehicle, manually grasping the second ends and stretching the elastic bands of first one pair of the elastic bands and then the other and securing said second ends thereof near opposite ends of the cross bars of the second frames at corresponding positions equally spaced from or even with the coplanar surfaces of the cross bars, projecting a straight line defined by the center marks of the elastic bands on the set of frames hung on one of the sets of tires past the elastic bands on the set of frames hung on the other set of tires, and noting the positions of the center marks of the elastic bands on the set of frames hung on said other set of tires with respect to the projected straight line.

The present invention enables quick, economic, and precise measurements, by one person, and provides measurements that may easily be cross-checked for accuracy.

BRIEF DESCRIPTION OF THE DRAWINGS

A better understanding of the present invention may be gained from a consideration of the following detailed description taken in conjunction with the accompanying drawings in which:

FIG. 1 is a perspective view of one of the frames of the present invention disposed on an exemplary motor vehicle wheel;

FIG. 2 is a partially cut-away view of two of the frames of the present invention, between the corresponding ends of which are disposed a conventional tape measure and an elastic band;

FIG. 3 is an end view of one of the cross bars of FIG. 2, taken along line 3—3 thereof;

FIG. 4 is a simplified plan view of a set of tires exhibiting exaggerated toe-in;

FIG. 5 is a simplified plan view of a set of motor vehicle wheels with the frames of the present invention mounted thereon;

FIG. 6 is an elevation view of a set of tires with the frames of the present invention disposed thereon;

FIG. 7 is a cut-away perspective view of the elastic band of the present invention;

FIG. 8 is a perspective view of the line projecting means of the present invention;

FIG. 9 is a simplified plan view of an exemplary front and rear set of motor vehicle tires in perfect alignment;

FIG. 10 is a simplified plan view of an exemplary front and rear set of motor vehicle tires in exaggerated misalignment; and FIG. 11 is a simplified view of a set of motor vehicle tires with rear tires out of square and exhibiting resultant offset.

DESCRIPTION OF THE PREFERRED EMBODIMENT

In FIGS. 1 and 2 there is shown wheel alignment measuring apparatus 10 of the present invention. With reference more particularly to FIG. 1, a frame 12 is shown disposed on an exemplary tire 14 resting on a road surface 15.

For ease of reference, it will be understood that terms herein such as "front", "rear", and so forth are taken with reference to the front and rear of an automobile, truck or trailer vehicle. The terms such as "inner" and "outer" refer, respectively, to directions toward the longitudinal axis of such a vehicle or away from such axis, unless qualified by the context.

A line 16 is shown in phantom lines in FIG. 1, which line 16 describes the outer circular side wall periphery of the tire 14, that is, the line which would contact a vertical plane which abutted the side wall of the tire 14. Naturally a precise circle would only obtain under ideal circumstances—when there was no bulge 18 in the tire 14 necessarily resulting from its carrying the weight of a vehicle (not shown)—but above the bulge 18 the line 16 describes a circle with adequate precision.

The frame 12 more particularly comprises an elongate cross bar 20 which is formed of tubular steel of square cross-section. The length of the cross bar 20 is somewhat greater than the diameter of the tire 14. The cross bar 20 includes coplanar surface 22 and 24 (FIG. 5) disposed in spatial relationship to engage different locations on the circular side wall periphery 16 of the tire 14. The frame 12 also includes a pair of stub members 26 and 28. The stub members 26 and 28 are formed of tubular steel of square cross-section, and are rigidly attached, as by welding, to the upper surface 30 of the cross bar 20. The stub members 26 and 28 are disposed intermediate the opposite ends of the cross bar 20, remote from one another and extending upwardly from the cross bar 20 and inwardly toward its center. The stub members 26 and 28 have surfaces 32 and 34, respectively (FIG. 5), which are coplanar with the coplanar surfaces 22 and 24 of the cross bar 20. The coplanar surfaces 32 and 34 of the stub members 26 and 28 are disposed in spatial relationship to engage different locations on the circular side wall periphery 16 of the tire 14. As may be seen in FIG. 2, there are shown a number of outer sidewall periphery lines 35 which illustrate graphically the range of tire sizes with which the apparatus of the present invention may effectively be used, all the while maintaining multiple coplanar surface contact between a frame and a tire sidewall periphery. If even greater range of usefulness is desired, larger or smaller frames may be provided.

The frame 12 also includes means 36 for detachably hanging the frame 12 on the tire 14 in loose proximity thereto. The means 36 for detachably hanging the frame 12 more particularly comprises a pair of hooks 38 and 40 having shanks, 42 and 44, respectively, and means 46 connecting the shanks 42 and 44 to respective stub members 26 and 28 near the upper ends thereof. The hooks 38 and 40 are each formed of a unitary piece of steel, and are provided on the ends of the shanks 42 and 44 with relatively large diameter washers 48 and 50 respectively. The washers 48 and 50 are rigidly secured to the hooks 38 and 40.

The means 46 connecting the shanks 42 and 44 to the stub members 26 and 28 comprises a pair of ears 52 and 54 rigidly disposed on respective stub members 26 and 28 intermediate the ends thereof. The ears 52 and 54 define holes 56 and 58, respectively, the diameters of which holes 56 and 58 are substantially larger than the outside diameters of corresponding hooks 38 and 40 which are disposed therethrough, and smaller than the outside diameters of the washers 48 and 50. Thus the connecting means 46 permits at least limited universal excursion of the hooks 38 and 40 whiel capturing the shanks 42 and 44 thereof.

The frame 12 also includes a pair of index marks 60 and 62 on the upper surface 30 of the cross bar 20, at opposite ends thereof, and extending longitudinally of the cross bar 20. As will be more fully appreciated when the operation of the frame 12 is discussed below, the index marks 60 and 62 are equally spaced from the coplanar surfaces 22 and 24 of the cross bar 20 as measured transversely of the cross bar 20.

The precise locations of the stub members 26 and 28 on the cross bar 20, the length and angular orientations of the stub members 26 and 28, and the length of hooks 38 and 40 are all chosen so as efficiently and effectively to cooperate with the dimensions of vehicle tire 14, and so as to allow use of the frame 20 with tires of various sizes within a range. The relationships of the distances, lengths and angles will become more apparent as the function of the frame 12 is more fully described below.

With reference especially to FIGS. 2 through 5, it can be seen that the wheel alignment measuring apparatus 10 of the present invention comprises at least one pair of frames, as frames 12 and 64. In FIG. 4 there is shown the wheel alignment measuring apparatus 10 of the present invention disposed on a pair of wheels with exaggerated toe-in. FIG. 5 depicts the same apparatus 10 on a pair of wheels that are aligned correctly, that is, without either toe-in or toe-out. And FIG. 6 depicts the operation of the apparatus 10 in measuring toe-in.

The complementary frame 64 is identical with the frame 12 as thus far described, with the exception that the frame 64 does not include index marks such as index marks 60 and 62 of the frame 12. The precise relationship between the various coplanar surfaces of a given frame may be more easily seen by taking reference to FIGS. 2 and 5. It should first be appreciated that the frames 12 and 64 of the present invention are substantially symmetrical about a central transverse axis. Each of the cross bars 12 and 64 has four coplanar surfaces, two on the respective cross bar, and one each on respective stub members. Thus, the frame 64 has a coplanar surface 32' on stub member 26' and a coplanar surface 150 on the cross bar 72, both of which are coplanar with each other, as well as with the two additional coplanar surfaces at the opposite end (not shown in the cut-away view of FIG. 2, but indicated in the elevation view of FIG. 5) of the cross bar 72.

The frame 64 includes hold-down means 66 for detachably capturing the free ends of a pair of conventional tape measures 68 and 70. (See FIG. 3) Thus the cross bar 72 of the frame 64 includes near opposite ends thereof, a pair of flat steel pressure plates 74 and 76 for clamping the free ends of the pair of tape measures 68 and 70 against corresponding corner surfaces 78 and 80 of the cross bar 72. As shown in FIGS. 2 and 3, the pressure plates 74 and 76 are biased against the upper surface 82 of the cross bar 72 by compression springs 84 and 86, which are held in place by any well known means. In the preferred embodiment as herein described, the springs 84 and 86 are held in place by bolts 88 and 90 which bolts are secured through the upper surface 82 of the cross bar 72 by nuts 92 and 94 at their threaded ends and by the abutment of washers 96 and 98 with the enlarged heads 100 and 102. Thus the pair of spring-loaded pressure plates 74 and 76 mounted near opposite ends of the cross bar 72 of the frame 64 are provided for clamping the free ends of the pair of the tape measures 68 and 70 against corresponding corner surfaces 78 and 80 of the cross bar 72. The pressure plates 74 and 76 are provided with extensions 104 and 106 which overhang the opposite ends of the cross bar 72 in order to provide fulcrum action so that the pressure plates 74 and 76 may be moved out of abutment with the upper surface 82 of the cross bar 72, thus to engage or release tape measures 68 and 70.

The wheel alignment measuring apparatus 10 also includes a pair of identical elastic bands, only one of which, 108, is shown in FIGS. 2 and 7. The elastic band 108 comprises a ⅛"×¾" flat band of pur gum rubber. The elastic band 108 in the unstretched state is of length slightly less than the width of a vehicle (not shown) with which it is to be used. The elastic band 108 has its center marked, as indicated by reference numeral 112, midway of its ends 116 and 118.

Connection means 123 are provided at the free ends 116 and 118 of the elastic band 108, disposed equidistant from the center mark 112. As may be seen most clearly in FIG. 7, the connection means 123 includes button members 124 and 126, and means 128 and 129 coupling the button members 124 and 126 to the elastic band 108. The button members 124 and 126 have relatively thin neck portions 130 and 131, and relatively large head portions 132 and 134. The length of the neck portion 128 is slightly greater than the width of the walls of the cross bars 20 and 72. The length of the neck portion 130 is slightly greater than the outer width of the cross bars 20 and 72. The connection means 123 also include two pairs of flat clamps, 136 and 140, which are connected to the ends 116 and 118 of the elastic band 108 by bolts 144 and 146, and which are rigidly connected to respective neck portions 128 and 130. The bottom member of 126 includes a ring 147 to facilitate stretching of the elastic band 108.

As shown in FIG. 2, the cross bars 20 and 72 include means 148 for detachably securing near opposite ends thereof, and at corresponding loactions parallel or even with the coplanar surfaces 22 and 24 of the cross bar 20 and coplanar surfaces 150 and 152 of the cross bar 72, as measured transversely of the cross bars 20 and 72, the connection means 123 at the free ends of a pair of elastic bands such as band 108. The means 148 for detachably securing the connection means 123 includes a pair of elongate open slots 154 in the inner wall 158 (only are being shown) of the cross bar 72, and two pairs of elongate open slots 160 and 162. The pairs of slots 160 and 162 are parallel, and are provided in the inner and outer walls of the cross bar 20 on opposite ends thereof. The means 148 also includes the relatively large abutment surfaces 168 and 170 on the head portions 132 and 134 for engaging the cross bars 20 and 72 by way of engagement with respective ones of the open slots 154, 160 and 162.

Referring now to FIGS. 8 and 9, there is shown a straight-line projection means 172 which includes a length of string 174, preferably carpenter's chalkline, and a pair of supports 176 and 178. The first support 176 more particularly comprises an upright metal post 180, rigidly connected to a metal base 182 by means of which connection the post 180 is disposed in a vertical attitude when the base 182 rests on a horizontal surface such as the ground. The top of the post 180 is adapted to releasably retain a free end 184 of the string 174. In the preferred embodiment the free end 184 of the string 174 is simply looped and placed over the post 180. The post 180 is about 12" in height.

The second support 178 more particularly comprises an upright metal post 186 which is rigidly connected to a metal base 188 by means of which connection the post 186 is disposed in a vertical attitude when the base 188 rests on a horizontal surface. The second support 178 also includes a reel 190 containing a quantity of the string 174 which reel 190 allows the playing out or reeling in of various amounts of the string 174. The string 174 may be played off of the reel 190 through a vertical adjustable eyelet 191. It is contemplated that the reel 190 be comprised of a conventional fishing reel such as is commonly available commercially. The post 186 is adjustable from about 9" to about 12" in height. The projection means 172 thus is adapted to describe a continuous set of horizontal straight lines of height about 9" to 12".

It may be observed in FIGS. 1 and 2 that the stub members 26 and 28 of the frame 12 are provided with holes 192 and 194 through the upper surfaces thereof. The holes 192 and 194 are of such size as to frictionally but easily releasably accommodate the hooks 38 and 40 respectively so as to retain the points therein when the apparatus is not in use. All of the stub members of the present invention are provided with such holes.

Operation

Turning now primarily to FIGS. 4-6, the use of the above-described wheel alignment measuring apparatus will be explained. With reference to the exemplary set of vehicle tires indicated generally by reference numeral 196 of a vehicle which is not shown (for purposes of clarity), having left tire 198 and right tire 200, a pair of frames 12 and 64 of the present invention is shown disposed on the exposed tires 198 and 200. The tires 198 and 200 both exhibit bulges 202 and 204 necessarily resulting from their bearing the weight of the vehicle (not shown) while they rest on the ground 206.

However, it should be understood that in use, an operator (not shown) first hangs the frame 12 on the tire 200. The operator places the hooks 38 and 40 into the tire 200 on opposite upper quadrants thereof. It is especially important that the hooks 38 and 40 be placed so as to ensure that the cross bar 20 is well above the bulge 204 and so that the frame 12 hangs in loose proximity to the circular side wall periphery (not shown) of the tire 200. If the frame 12 is hung so low on the tire 200 that the cross bar 20 would contact any part of the tire bulge 204, specious measurements would result because one-point rather than two-point contact would be obtained with the circular side wall periphery. Normally the operator ensures that the cross bar 20 is approximately level by visual examination. It is not necessary that the coplanar surfaces 22, 24, 32 and 34 of the frame 12 abut the circular side wall periphery; it is allowable, however. But it is preferable that there be a slight gap between the cross bar 20 and the circular side wall periphery as indicated at 208 in FIG. 6, the reason for which will be explained in a subsequent paragraph.

The operator next stretches a pair of conventional metal tape measures 68 and 70 out on the ground beneath the vehicle, one tape 70 immediately in front of the tires 198 and 200, so that the free, tab ends 210 and 212 of the tapes 68 and 70 are disposed near the left tire 198, and the reel ends 214 and 216 are disposed near the right tire 200.

The operator then moves around to the left tire 198 and places the frame 64 on the left tire 198 in a similar manner to that described above with respect to the right frame 12. Normally, the frame 64 would be visually adjusted to be approximately level to the deck. However, should it be necessary in order to clear various undercarriage elements, both the frame 12 and the frame 64 may be tilted slightly, so long as they are adjusted to be parallel one to the other.

The operator then attaches the tab ends 210 and 212 of the tape measures 68 and 70 to hold-down means 66 of the frame 64 by capturing the tab ends 210 and 212 beneath the respective pressure plates 74 and 76 such that the downturned tabs 210 and 212 are clamped against corresponding corner surfaces 78 and 80 of the cross bar 72.

Back on the right side of the vehicle, the operator picks up the tapes 68 and 70 near the reel ends 214 and 216 thereof, and, gently but firmly, manually snugs the cross bar 20 of the frame 12 against the exposed side wall of the tire 200 (arrow "B" in FIGS. 6 and 7) while simultaneously grasping and exerting approximately equal tension on the tape measures 68 and 70 so as to similarly snug the cross bar 72 of the frame 64 against the exposed side wall of the tire 198 (arrow "A" in FIGS. 6 and 7). It is most important that the operator "feel" that the tension in the two tapes 68 and 70 is equal, because a relatively small difference therein may be enough to cause one end of the cross bar 20 or the cross bar 72 to "cut" into the respective tire, thus unbalancing the measurement. In practice it has been found that an operator can "feel" accurately enough that the error from improper (or unequal) tensioning of the tapes 68 and 70 can be limited to no more than about 1/32" to 1/16".

Finally, the operator, while maintaining constant and equal tension as described in the foregoing paragraph, notes the tape measure readings at corresponding locations on the frame 12 equally spaced from or even with the coplanar surfaces 22 and 24 on the cross bar 20 of the frame 12, but preferably by reference to the two index marks 60 and 62 on the top surface of the cross bar 20. Comparison of the two readings obtained will give the amount of toe-in (or toe-out) in linear units, normally inches.

With reference now to FIGS. 9, 10 and 11, there are symbolically illustrated additional steps in the method of the present invention. FIG. 9 shows two sets of wheels in perfect alignment. FIG. 10 shows two sets of wheels in which one set (the rear) is out of square with respect to the other set. FIG. 11 shows two sets of wheels in which one set is offset from the other. For the sake of clarity, new reference numerals will be assigned to the various elements of the apparatus 10 as shown in these figures. Thus, two pairs of first and second frames 260 and 262, and 264 and 266, respectively, are shown mounted on a rear and front chosen set of tires 268 and 270. (The first frames correspond to frame 64 in the foregoing, and the second frames to frame 12). The front, or steerable, set of tires includes right tire 272 and left tire 274. The rear, or driving, set of tires includes a right exposed tire 276 and a left exposed tire 278. The first frame 260 includes a cross bar 280 with coplanar surfaces 282 and 284. The second frame 262 includes a cross bar 286 with coplanar surfaces 288 and 290. The first frame 264 includes a cross bar 292 with coplanar surfaces 294 and 296. The second frame 266 includes a cross bar 298 with coplanar surfaces 300 and 302.

Although two pairs of frames of the present invention are shown already in place, this is for ease of illustration, and it will readily be realized, in reading the subsequent description of the additional method steps, that the foregoing steps relating to the hanging of the frames and the measurement of toe-in are assumed already to have been accomplished with respect to the rear set of tires 268.

Hence the operator (not shown) hangs the frames 264 and 266 on the front set of wheels 270 and performs all of the above-described steps relating to measuring the toe-in of the set of tires 270. (N.B. For clarity of illustration, no tape measures are shown in FIGS. 9-11. It is to be understood, however, that they are used in the toe-in measuring part of the method, and can remain in place for the remaining steps thereof.)

The operator then secures near opposite ends of cross bars 280 and 292 of the first frames 260 and 264 at corresponding positions equally spaced from or even with the coplanar surfaces 282 and 284, and 294 and 296, of the cross bars 280 and 292, first ends 304, 306, 308 and 310 of two pairs of elastic bands 312, 313, 314, 315, each elastic band being adapted to stretch across the width of the vehicle in response to relatively minimal pulling force, and each band having a center mark 316, 318, 320 and 322 located midway of its length. In the preferred embodiment the elastic bands 312, 313, 314 and 315 will be secured as described above with respect to the frames 12 and 62.

Next, the operator extends the elastic bands underneath and across the vehicle (not shown) to the cross bars 286 and 298 of the second frames 262 and 266 on the other side of the vehicle, and manually grasps second ends 324, 326, 328 and 330 of the elastic bands 312, 313, 314, 315, and pulls first one pair of the elastic bands and then the other, and secures the second ends 324, 326, 328 and 330 near opposite ends of the cross bars 286 and 298 of the second frames 262 and 266 and corresponding positions equally distant from or even with the coplanar surfaces 288 and 290, and 300 and 302 of the cross bars 286 and 298.

The operator then projects a straight line 332 defined by the center marks 316 and 318 of the elastic bands 312 and 313 on the set of frames 260 and 262 hung on the rear set of tires 268 past the center marks 330 and 332 of the elastic bands 314 and 315 on the set of frames 264 and 266 hung on the front set of tires 270.

All that remains is for the operator to note the positions of the center marks 320 and 322 of the elastic bands 314 and 315 on the set of frames 264 and 266 hung on the front set of tires 270 with respect to the projected straight line 332. By so noting the positions of the center marks 320 and 322 with respect to the line 332 the operator may determine the offset, if any, between the two sets of tires 268 and 270. It may facilitate such comparision to manipulate the vehicle steering wheel (not shown) so as to bring the center marks 320 and 322 equal distances from the line 322, thus giving the offset between sets of tires directly.

Another variation of the method of the present invention is illustrated symbolically in FIG. 11, wherein a vehicle frame is indicated by number 334. As with regard to the method steps immediately preceding, it will be assumed that the pair of frames 260 and 262 on the set of tires 268 has already been used, with tape measures (not shown), to measure the toe-in of the tires 276 and 278. It will also be assumed herein that the pair of elastic bands 312 and 313 has already been disposed tautly between respective cross bars 280 and 286. Thus the operator projects a centerline 336 of the vehicle frame by means of the projection means (not shown) of the present invention. The operator then notes the positions of the center marks 316 and 318 of the elastic bands 312 and 313 with respect to the vehicle frame centerline 336. The operator might also measure the lateral offset of each of the center marks 316 and 318 of the elastic bands from the vehicle frame centerline 336 in order to more directly obtain the offset distance between the set of tires 268 and the vehicle frame centerline 336.

It should be noted that all of the above-described variations of the method of the present invention may be utilized with greatest accuracy if the method steps given above are preceded by driving or otherwise rolling the vehicle about 20′ to 40′ on a flat surface in order to cause the manifold steering system geometries and tolerances to assume their natural running configurations under straight-ahead rolling conditions. The importance of this step can be most fully appreciated by referring to the above discussion of the prior art and the statement of invention.

Now it will be understood that the foregoing apparatus and method have been described with reference to a two-axle vehicle. This has been for purposes of example and clarity of explanation only. In the more general case, vehicles may have as many as five or six axles, some with more than two wheels mounted thereon. It is within the scope of the present invention to measure alignment of such multi-axle vehicles by the method taught hereinabove. It should also be understood that the steps of the foregoing method may be accomplished in various sequences. Many combination are possible, as will be obvious to one skilled in the art. In particular, however, it should be noted that the measurement of toe-in does not absolutely depend upon manually snugging the cross bars against the respective tire side wall peripheries through the instrumentality of tape measures. It is possible that the tire cross bars be snugged against the tires by tautly disposing the elastic bands therebetween prior to taking any actual measurements with the tape measures. Since the elastic bands are uniform, equal tension at each end of the cross bars is assured, so as to prevent any potential unbalance in the measurements thus obtained.

Accordingly, any and all modifications, variations, or equivalent arrangements which may occur to those skilled in the art should be considered to be within the scope of the invention as defined in the appended claims.

What is claimed is:

1. Wheel alignment measuring apparatus adapted to facilitate manual alignment measurements relative to the conventional front and rear sets of tires of an automobile, truck or trailer vehicle through the use of a pair of conventional tape measures by one person while the tires are carrying the weight of the vehicle, said apparatus comprising:

a pair of elastic bands, adapted to stretch across the width of the vehicle, each band having its center marked, and having connection means at each free end thereof disposed equidistant from the center mark;

a pair of frames adapted to be disposed respectively on opposite sides of the vehicle loosely adjacent the outer circular side wall peripheries of the exposed tires in a chosen set;

each of said frames including an elongated cross bar having coplanar surfaces disposed in spatial relationship to engage different locations on the circular side wall periphery of either of said exposed tires in the chosen set;

each of said frames also including means for detachable hanging the frame on either of said exposed tires in loose proximity to the side wall thereof;

said cross bars of both frames including means for detachably securing near opposite ends thereof, and at cooresponding locations parallel or even with said coplanar surfaces of the cross bars as measured transversely of the cross bars, the connection means at the free ends of the pair of elastic bands;

at least one of said frames having hold-down means for detachably capturing the free ends of a pair of conventional tape measures near opposite ends of the cross bar at corresponding positions equally spaced from or even with said coplanar surfaces of the cross bar as measured transversely of the cross bar.

2. The apparatus of claim 1, wherein the elastic bands are of sufficient length in their unstretched condition to extent substantially across the entire width of a conventional vehicle, sufficiently to enable them to be connected to a frame on the one side of the vehicle and to freely extend to a position where their free ends can be grasped by a person on the opposite side of the vehicle to stretch the bands and connect them to the frame there disposed.

3. The apparatus of claim 1, wherein the cross bars of both frames are constructed of tubular metal of rectangular section, said cross bars having elongate open slots at opposite ends thereof, and wherein the connecting means at each free end of the elastic bands comprises a button member, and means coupling the button member to the elastic band, said button member having a relatively thin neck portion adapted for insertion into said open slots and a relatively large head portion having an abutment surface thereon for engaging the cross bar.

4. A method for making alignment measurements relative to the conventional front and rear sets of tires of an automobile, truck or trailer vehicle while the tires are carrying the weight of the vehicle, through the use of first and second frames each of which includes an elongated cross bar having coplanar surfaces disposed in spatial relationship to engage different location on the circular side wall periphery of a chosen tire, said method comprising the steps of:

hanging said frames on the exposed tires in a chosen set so that the cross bars of the frames are approximately parallel to the ground and are disposed above the bulge in the tires necessarily resulting from their carrying the vehicle weight, and so that said coplanar surfaces on the cross bars are disposed in loose proximity to the circular peripheries of the exposed side walls of the tires on opposite sides of the vehicle;

extending a pair of conventional tape measures underneath and across the vehicle;

securing the free ends of the pair of tape measures near opposite ends of the cross bar of the first frame at corresponding positions equally spaced from or even with said coplanar surfaces of the cross bar as measured transversely of the cross bar;

manually snugging said cross bar of the second frame against the exposed side wall of the tire on which it is hung while simultaneously grasping and exerting approximately equal tension on the tape measures so as to similarly snug the cross bar of the first frame against the exposed side wall of the tire on which it is hung;

noting the difference in measurements of the pair of tapes at corresponding locations on the second frame equally spaced from or even with said coplanar surfaces on the cross bar of the second frame as measured transversely of the cross bar hanging a second set of first and second frames on the exposed tires in a second chosen set of the vehicle tires so that the cross bars of the frames are approximately parallel to the ground and are disposed above the bulge in the tires necessarily resulting from their carrying the vehicle weight, and so that said coplanar surfaces of the cross bars are disposed in loose proximity to the circular peripheries of the exposed side walls of the tires on opposite sides of the vehicle;

securing near opposite ends of the cross bars of the first frames of said first and second sets of frames at corresponding positions equally spaced from or even with said coplanar surfaces of the cross bars, first ends of two pairs of elastic bands, each elastic band being adapted to stretch across the width of the vehicle in response to relatively minimal pulling force and each band having a center mark located midway of its length;

extending the elastic bands underneath and across the vehicle to the cross bars of the second frames of said first and second sets of frames on the other side of the vehicle;

manually grasping the second ends and stretching the elastic band of first one pair of the elastic bands and then the other and securing said second ends thereof near opposite ends of the cross bars of the second frames at corresponding positions equally spaced from or even with said coplanar surfaces of the cross bars;

projecting a straight line defined by the center marks of the elstic bands on the set of frames hung on one of the sets of tires past the elastic bands on the set of frames hung on the other set of tires; and, noting the positions of the center marks of the elastic bands on the set of frames hung on said other set of tires with respect to the projected straight line.

5. The method of claim 4, wherein said first set of tires is a rear set of tires, and wherein said second set of tires is a steerable front set of tires, wherein said step of hanging the first set of frames on the first set of tires is preceded by the step of rolling the vehicle along the ground for a distance sufficient to cause the vehicle steering geometry and tolerances to assume their normal running relationship.

6. A method for making alignment measurements relative to the conventional front and rear sets of tires of an automobile, truck or trailer vehicle while the tires are carrying the weight of the vehicle, through the use of first and second frames each of which includes an elongated cross bar having coplanar surfaces disposed in spatial relationship to engage different location on the circular side wall periphery of a chosen tire said method comprising the steps of:

hanging said frames on the exposed tires in chosen set so that the cross bars of the frames are approximately parallel to the ground and are disposed above the bulge in the tires necessarily resulting from their carrying the vehicle weight, and so that said coplanar surfaces on the cross bars are disposed in loose proximity to the circular peripheries of the exposed side wall of the tires on opposite sides of the vehicle;

extending a pair of conventional tape measures underneath and across the vehicle;

securing the free ends of the pair of tape measures near oppostie ends of the cross bar of the first frame at corresponding positions equally spaced from or even with said coplanar surfaces of the cross bar as measured transversely of the cross bar;

manually snugging said cross bar of the second frame against the exposed side wall of the tire on which it is hung while simultaneously grasping and exerting approximately equal tension on the tape measures so as to similarly snug the cross bar of the first frame against the exposed side wall of the tire on which it is hung;

noting the difference in measurements of the pair of tapes at corresponding locations on the second frame equally spaced from or even with said coplanar surfaces on the cross bar of the second frame as measured transversely of the cross bar projecting the centerline of the vehicle frame;

disposing a pair of elastic bands, which elastic bands have their centers marked, tautly between respective opposing ends of the cross bars of said first and second frames; and noting the positions of the center marks of the elastic bands with respect to the vehicle frame centerline.

7. The method of claim 6, wherein said chosen set of tires is steerable, in which method the step of noting the positions of the center marks of the elastic bands with respect to the vehicle frame centerline further comprises the step of manipulating the vehicle steering wheel so as to attempt to bring the center marks of the elastic bands into equally laterally offset relationship with the vehicle frame centerline.

8. The method of claim 7, in which said vehicle tires are in normal running road engagement, and in which the step of hanging said frames is preceded by the steps of rolling the vehicle for a short distance with the steering wheel centered so as to cause the vehicle steering geometry and tolerances to assume their normal running relationships.

9. The method of claim 6 or 7 in which said step of noting the positions of the center marks of the elastic bands with respect to the vehicle frame centerline includes the step of measuring the lateral offset between each of the center marks of the elastic bands from the vehicle frame centerline.

10. A method for making alignment measurements relative to the conventional front and rear sets of tires of an automobile, truck or trailer vehicle while the tires are carrying the weight of the vehicle, through the use of two sets of first and second frames, each frame of which includes an elongated cross bar having coplanar surfaces disposed in spatial relationship to engage different locations on the circular side wall periphery of a chosen tire, said method comprising the steps of:

hanging one of said sets of frames on the exposed tires in a first chosen set of tires, and the other set of frames on the exposed tires in a second chosen set of tires so that with respect to each set of tires the cross bars of the frames are approximately parallel to the ground and are disposed above the bulge in the tires necessarily resulting from their carrying the vehicle weight, and so that said coplanar surfaces on the cross bars are disposed in loose proximity to the circular peripheries of the exposed side walls of the tires on opposite sides of the vehicle;

securing a first pair of elastic bands tautly between opposing ends of the first and second frames of one of said sets of frames, and securing a second pair of elastic bands tautly between opposite ends of the first and second frames of the other of said sets of frames, each elastic band having a center mark located midway of its length;

projecting the straight line defined by the center marks of the elastic bands on the set of frames hung on the first chosen set of tires past the elastic bands on the set of frames hung on the other chosen set of tires; and noting the positions of the center marks of the elastic bands on the set of frames hung on said second chosen set of tires with respect to the projected straight line.

11. The method of claim 10, in which the step of securing the elastic bands further comprises the steps of:

securing near opposite ends of the cross bars of the first frames of said sets of frames at corresponding positions equally spaced from or even with said coplanar surfaces of the cross bars, first ends of said elastic bands, each elastic band being adapted to stretch across the width of the vehicle in response to relatively minimal pulling force;

extending the elastic bands underneath and across the vehicle to the cross bars of the second frames of said sets of frames; and, manually grasping the second ends and stretching the elastic bands of first one pair of the elastic bands and then the other and securing said second ends thereof near opposite ends of the cross bars of the second frames at corresponding positions equally spaced from or even with said coplanar surfaces of the cross bars.

12. A method for making alignment measurements realtive to the conventional front and rear sets of tires of an automobile, truck or trailer vehicle while the tires are carrying the weight of the vehicle, through the use of first and second frames each of which includes an elongated cross bar having coplanar surfaces disposed in spatial relationship to engage different location on the circular side wall periphery of a chosen tire, said method comprising the steps of:

projecting the centerline of the vehicle frame;

hanging said frames on the exposed tires in a chosen set so that the cross bars of the frames are approximately parallel to the ground and are disposed above the bulge in the tires necessarily resulting from their carrying the vehicle weight, and so that said coplanar surfaces on the cross bars are disposed in loose proximity to the circular peripheries of the exposed side walls of the tires on opposite sides of the vehicle;

disposing a pair of elastic bands, which elastic bands have their centers marked tautly respective opposing ends of the cross bars of said first and second frames; and, noting the positions of the center marks of the elastic bands with respect to the vehicle frame centerline.

13. A method for making alignment measurements relative to the conventional front and rear sets of tires of an automobile, truck or trailer vehicle while the tires are carrying the weight of the vehicle, through the use of first and second frames each of which includes an elongated cross bar having coplanar surfaces disposed in spatial relationship to engage different location on the circular side wall periphery of a chosen tire, said method comprising the steps of:

hanging said frames on the exposed tires in a chosen set so that the cross bars of the frames are approximately parallel to the ground and are disposed above the bulge in the tires necessarily resulting from their carrying the vehicle weight, and so that said coplanar surfaces on the cross bars are disposed in loose proximity to the circular peripheries of the exposed side walls of the tires on opposite sides of the vehicle;

securing a pair of elastic bands tautly between opposite ends of the frames so as to snug the cross bars against the respective exposed side walls of the tires on whih they are hung, each elastic band having a center mark located midway of its length;

extending a pair of conventional tape measures underneath and across the vehicle;

securing the free ends of the pair of tape measures near opposite ends of the cross bar of the first frame at corresponding positions equally spaced from or evenwith said coplanar surfaces of the cross bar as measured transversely of the cross bar;

manually grasping and exerting approximately equal tension on both tape measures; and noting the difference in measurements of the pair of tapes at corresponding locations on the second frame equally spaced from or even with said coplanar surfaces on the cross bar of the second frame as measured transversely of the cross bar.

14. The method of claim 13, in which said vehicle tires are in normal running road engagement, and in which the step of hanging said frames is preceded by rolling the vehicle for a short distance so as to cause the vehicle steering geometry and tolerances to assume their normal running relationships.

15. The method of claim 13, in which the step of securing the elastic bands further comprises the steps of:

securing near opposite ends of the cross bar of one of the first and second frames at corresponding positions equally spaced from or even with said coplanar surfaces of the cross bar, first ends of said elastic bands, each elastic band being adapted to stretch across the width of the vehicle in response to relatively minimal pulling force;

extending the elastic bands underneath and across the vehicle to the cross bar of the other of the first and second frames; and, manually grasping the second ends and stretching the elastic bands and then securing said second ends thereof near opposite ends of the cross bar of the other of the first and second frames at corresponding positions equally spaced from or even with said coplanar surfaces of the cross bar.

* * * * *